(12) United States Patent
Narasimhan et al.

(10) Patent No.: US 6,240,291 B1
(45) Date of Patent: May 29, 2001

(54) METHOD FOR HANDOFF IN WIRELESS COMMUNICATION SYSTEMS USING PATTERN RECOGNITION

(75) Inventors: Ravi Narasimhan, Los Altos; Donald C. Cox, Stanford, both of CA (US)

(73) Assignee: The Board of Trustees of the Leland Stamford Junior University, Stamford, CA (US)

(*) Notice: Subject to any disclaimer, the term of this patent is extended or adjusted under 35 U.S.C. 154(b) by 0 days.

(21) Appl. No.: 09/392,975

(22) Filed: Sep. 9, 1999

(51) Int. Cl.[7] ................................................ H04Q 7/20
(52) U.S. Cl. .................... 455/436; 455/522; 455/432; 455/422; 455/442; 455/438
(58) Field of Search .................................. 455/522, 422, 455/442, 432, 436, 438

(56) References Cited

U.S. PATENT DOCUMENTS

| | | | |
|---|---|---|---|
| 5,175,867 | * 12/1992 | Wejke et al. | 455/33.1 |
| 5,570,349 | * 10/1996 | Bustamante et al. | 370/18 |
| 5,657,487 | 8/1997 | Doner | 455/456 |
| 5,754,945 | 5/1998 | Lin et al. | 455/33.2 |
| 5,884,187 | * 3/1999 | Ziv et al. | 455/522 |
| 5,901,354 | * 5/1999 | Menich et al. | 455/442 |
| 5,920,549 | 7/1999 | Bruckert et al. | 370/331 |

* cited by examiner

Primary Examiner—Daniel Hunter
Assistant Examiner—Lana Le
(74) Attorney, Agent, or Firm—Lumen IPS, Inc (57) ABSTRACT

A handoff technique for wireless communication systems uses pattern recognition of signal strength data to anticipate handoffs and reduce the total number of handoffs in the system. A criterion for system performance is used in determining the necessity for handoff. A window of signal samples from nearby base stations constitutes a pattern vector which is classified using a probabilistic neural network or other learning machine. The use of averaged signals and the sequencing of classes allow for a small number of training vectors for the pattern classifier. Substantially increased performance requires only one training vector per class. Simulation results indicate that, for a given probability of failure, the pattern recognition based handoff technique yields fewer handoffs than the conventional hysteresis rule.

9 Claims, 6 Drawing Sheets

METHOD FOR HANDOFF IN WIRELESS COMMUNICATION SYSTEMS USING PATTERN RECOGNITION

FIELD OF THE INVENTION

The present invention relates to wireless communication systems. More specifically, it relates to improved handoff techniques in cellular communication networks.

BACKGROUND OF THE INVENTION

Wireless communication networks provide communication services to mobile devices such as cellular telephones, wireless modems, and pagers. A network typically has a set of base stations distributed across a geographical service area. A mobile device accesses the network at any given time through a wireless communication link with one of the base stations. As the device moves through the service area, however, the network must handoff the communication link to other base stations so that the service is not interrupted or degraded. Techniques related to handoff in wireless communication system are disclosed in U.S. Pat. No. 5,920,549 to Bruckert et al., U.S. Pat. No. 5,901,354 to Menich et al., U.S. Pat. No. 5,754,945 to Lin et al., and U.S. Pat. No. 5,657,487 to Doner. These patents are incorporated herein by reference in their entirety for all purposes.

In current wireless networks, the decision to execute a handoff to a nearby base station is typically performed by the network, often using received strength signal indicator (RSSI) information provided by the mobile devices to the base stations. The information provided from a mobile device typically includes values indicating the strengths of signals received at the mobile from several nearby base stations. The communication network then makes a handoff decision according to a hysteresis rule. If the signal power from a nearby base station exceeds by a predetermined hysteresis level that of the base station currently providing the link, then a handoff to the nearby base station is executed. This technique, however, is problematic due to variations in the signal power level that are not correlated to distance from the base station. Because the signal from the mobile device scatters from nearby objects, the signal power experiences variations as the mobile device moves over small spatial scales (i.e., distances on the order of a wavelength). In addition, there are signal power variations as the mobile device moves over larger spatial scales (i.e., distances on the order of building sizes). These variations are caused by shadowing of the signal by local obstructions such as buildings, hills, and the like. In order to mitigate the effect of small scale variations, conventional handoff techniques compute an average of signal samples collected as the mobile device moves over a few wavelengths, and then applies the hysteresis rule to this average signal. This technique, however, only mitigates small scale variations. The average signal still experiences considerable fluctuation due to shadow fading on larger scales. As a result, this local shadow fading often causes inappropriate and unnecessary handoffs that deteriorate the wireless system performance and degrade the quality of service to the mobile device.

SUMMARY OF THE INVENTION

The present inventors have discovered a novel technique for significantly reducing unnecessary and inappropriate handoffs in cellular communication networks, thereby improving service and system performance. Because shadow fading is repeatable due to its strong correlation to the spatial location of a mobile device in its environment, pattern recognition techniques can be used to identify shadow fading and prevent unwanted handoffs that would otherwise have been executed using conventional techniques. More specifically, the averaged signals of mobile devices that have followed the same geographical paths will have similar shadow fading properties. According to the technique of the invention, these averaged signals are stored along with information regarding handoff decisions. The signal from a mobile device that is traveling along a known path can then be compared with the stored signal to determine if a handoff is actually necessary. The inventors provide a technique to recognize these patterns in the signals from mobile devices using probabilistic neural networks, as well as a handoff method using this pattern recognition technique.

In one aspect of the invention, a method is provided for determining handoff in a wireless communication system comprising a plurality of base stations and a mobile device. The method comprises: (a) collecting at nearby base stations signal power level information representative of signal strength between the mobile device and the nearby base stations; (b) associating the power level information with predetermined power level patterns to produce an output representing measures of similarity between the power level information and the predetermined power level patterns; (c) selecting a sequence of matching patterns from the set of predetermined power level patterns, wherein each of the matching patterns has a maximal degree of similarity with a portion of the power level information; and (d) analyzing a sequence of sets of allowable base stations to determine an appropriate base station for handoff, wherein the sequence of sets of allowable base stations correspond to the sequence of matching patterns.

Preferably, the predetermined power level patterns are correlated with shadow fading in a propagation environment of the mobile device. More specifically, the signal power level information preferably comprises a sequence of average signal power level estimates corresponding to mobile device positions separated by less than a correlation length of a log-normal shadow fading in a propagation environment of the mobile device. Each of the average signal power level estimates is preferably an average of signal power level samples corresponding to mobile device positions separated by less than a wavelength of a carrier signal of the communication system. The signal power level samples are preferably measured at times selected such that the samples correspond to mobile device positions separated by approximately equal spatial intervals.

The step of associating the power level information with the predetermined power level patterns preferably comprises applying the power level information to a probabilistic neural network whose weights are equal to training vectors derived from training power level information. Other types of neural networks or learning machines, however, may also be used. The predetermined power level patterns preferably have a predetermined sequence corresponding to a sequence of patterns observed in a training session. The step of analyzing the sequence of sets of allowable base stations to determine the appropriate base station for handoff preferably comprises selecting a base station that is an allowable base station for a subsequent pattern in a predetermined sequence of power level patterns. In a preferred embodiment, the method also comprises determining a degree to which adjacent patterns in the sequence of matching patterns meet an adjacent pattern matching tolerance value.

DETAILED DESCRIPTION

A preferred embodiment of the techniques of the present invention will now be described in the context of a typical cellular communications environment. Those skilled in the art, however, will recognize that the central ideas of the invention are not limited to many of the details below.

Wireless Propagation Model

An understanding of the techniques of the present invention is facilitated by the following description of a wireless propagation model.

The small scale signal variation considered in the present description is assumed to be caused by the sum of several waves with random phases and amplitudes with no direct path between the base station and the mobile device. Under these conditions, the envelope $r_k$ of the received signal at a distance $d_k$ from the base station to the mobile device can be modeled as a Rayleigh-distributed random variable with probability density function $f(r_k)$ given by $$f(r_k) = \frac{r_k}{p_k} \exp\left(-\frac{r_k^2}{2p_k}\right), r_k \geq 0, \tag{1}$$

where $p_k$ is a parameter of the density function, and k is a discrete time index. The mean of the Rayleigh distribution is $E[r_k] = (\pi p_k/2)^{1/2}$. The small scale variation which can be modeled by equation (1) is called "Rayleigh fading". The variation of received signal power with distance is modeled as $1/d_k^n$, with n ranging from 2 to 6, depending on the degree of multipath in the environment. (In an open plain n=2, in an average suburban environment n=4, and in a dense urban environment n=6.)

The shadow fading is modeled as a correlated log-normal random process as is well-known in the art, e.g., as described in D. C. Cox, "Universal Digital Portable Radio Communication," *Proceedings of the IEEE*, vol. 75, no. 4, pp. 436–477, 1987, and in M. Gudmundson, "Correlation Model for Shadow Fading in Mobile Radio Systems," *Electron. Lett.*, vol. 27, no. 23, pp. 2145–2146, 1991. Let $R_L(d)$ denote the autocorrelation function of the shadow fading random process L(d), where d is the distance from the mobile to the base and L(d), measured in decibels (dB), is a normally distributed random process. The autocorrelation, $R_L(d)$, is given by:

$$R_L(d) = \sigma_L^2 \exp\left(-\frac{|d|}{d_0}\right), \tag{2}$$

where $\sigma_L^2$ and $d_0$ are, respectively, the variance and correlation length of L(d). From equation (2), the power spectrum $S_L(V)$ of L(d) is given by:

$$S_L(v) = \frac{2d_0 \sigma_L^2}{1 + (2\pi v d_0)^2}, \tag{3}$$

where v is the spatial frequency. For a total distance travelled, D, the shadow fading process can be shown to be:

$$L(d) = \sum_{j=-J}^{J} \sqrt{\frac{2}{BD} S_L\left(\frac{j}{D}\right)} \cos\left(\frac{2\pi j d}{D} + \phi_j\right), \tag{4}$$

where $$B = \frac{1}{\sigma_L^2 D} \sum_{j=-J}^{J} S_L\left(\frac{j}{D}\right), \tag{5}$$

$$J = D v_m, \tag{6}$$

where $v_m$ is the maximum spatial frequency taken into account, and $\phi_j$, is an independent, identically distributed uniform random process in [0,2 $\pi$). The process L(d) is sampled at $d=d_k$ to obtain $L_k$. (In typical applications of the present invention, the sampling period is preferably between 5 and 35 ms/sample, and can be constant or variable.)

In the absence of Rayleigh fading, the signal is expressed in dB by $$m_k = C_0 - 10n \log_{10} d_k + L_k, \tag{7}$$

where $C_0$ is a constant which includes the power transmitted, antenna parameters, and carrier frequency. Thus, the received signal, including Rayleigh fading (in dB), is given by:

$$s_k = 20 \log_{10} r_k, \tag{8}$$

where $r_k$ is a Rayleigh distributed random variable with parameter $p_k = (1/2)^{(m_k/10)}$. The mean and variance of $s_k$ are given, respectively, by:

$$\bar{s}_k = 10 \log_{10}(2 p_k) - \frac{10\gamma}{\ln 10} = m_k - \frac{10\gamma}{\ln 10}, \tag{9}$$

$$\sigma_{s_k}^2 = \frac{50\pi^2}{3(\ln 10)^2}, \tag{10}$$

where $\gamma \approx 0.577216$ is Euler's Gamma. The signal is non-stationary since $\bar{s}_k$ is not constant and varies according to equation (9). The model presented here is used below for performance evaluation of the hysteresis rule and the pattern recognition handoff algorithm.

Pattern Recognition Using Probabilistic Neural Networks

Figure 1:
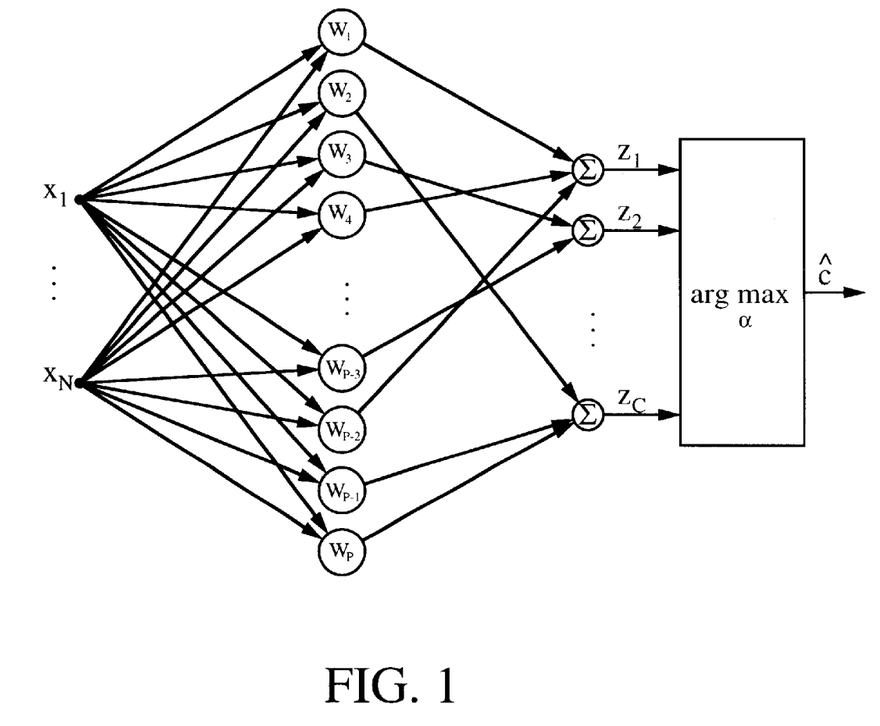
FIG. 1 is a schematic diagram of a probabilistic neural network used in a preferred embodiment of the handoff determination technique of the invention.

In the preferred embodiment, a probabilistic neural network (PNN), whose structure is shown in FIG. 1, is used in the handoff algorithm. This network, or an equivalent learning machine, is implemented in a signal processor of the communication system. Signal processors are used in wireless communication systems that use conventional handoff techniques. The implementation of the present invention is similar to conventional systems with the primary exception of the operation and structure of the signal processor used for determining handoff. Thus, the following description will focus primarily on these differences, as those skilled in the art will already understand and appreciate the conventional architecture and operation of a wireless communication system having handoff management capabilities.

The following notations will be used to describe the PNN shown in FIG. 1. Let $X=[x_1,x_2,\ldots,x_n]^T$ denote a test vector to be classified (i.e., matched with a pattern). Such a vector is a portion of signal power information collected at several base stations. As illustrated in the figure, the vector is applied to the PNN from the left and its components are fed to the various neurons, labeled $W_1, W_2, W_3, W_4, \ldots, W_{P-3}, W_{P-2}, W_{P-1}, W_P$. Let $X_p=[x_{p,1},x_{p,2},\ldots,x_{p,N}]^T$ represent the p-th training vector (i.e., pattern), let $c_p$ be the pattern label (i.e., class) of $X_p$, and let $W_p=[w_{p,1},w_{p,2},\ldots,w_{p,N}]^T$ be the weight vector of the p-th neuron in the PNN. The number N is a design parameter that preferably has an integral value of at least 50. If computational complexity is a consideration, N is preferably less than 300. The output $y_p$ of the p-th neuron is given by:

$$y_p = \exp\left(-\frac{\|X-W_p\|^2}{\sigma_N^2}\right), \quad (11)$$

where $\sigma_N^2$ is a "smoothing parameter" of the PNN. Those skilled in the art will appreciate that other substantially similar formulas can be substituted for relation (11), provided they measure a degree of similarity between X and $W_p$. Note that if $X=W_p$, then $y_p=1$, and as the difference between X and $W_p$ increases, $y_p$ approaches 0.

Let P be the number of training vectors or neurons ($p=1,2,\ldots,P$) and C be the number of classes of patterns ($c_p=1, 2, \ldots, C$). A class of patterns corresponds to a recognizable segment of a path of the mobile device. These segments are typically 50 m to 200 m portions of a path followed by the mobile device. In a preferred implementation P=C since only one pattern is required to recognize each segment of a path. The total number C of pattern classes is equal to the total number of recognizable segments in all the paths that the system has been trained to recognize. The value of C is preferably in the range from 10 to 1000 or more. In alternate embodiments P>C since multiple training vectors can be used to recognize each segment of a path (e.g., corresponding to different seasons or other environmental changes). The weights of the neurons are set equal to the training vectors, $$W_p=X_p, p=1,2,\ldots,P. \quad (12)$$

$$Y_\alpha=\{y_p:c_p=\alpha\}, \alpha=1,2,\ldots,C, \quad (13)$$

$$z_\alpha = \sum_{y_p \in Y_\alpha} y_p, \quad \alpha = 1, 2, \ldots, C. \quad (14)$$

The set of outputs $y_p$ of all neurons whose training patterns $X_p$ belong to class $\alpha$ is $Y_\alpha$, and the sum of the elements of $Y_\alpha$ is $z_\alpha$. The association of neurons with classes (i.e., the manner in which the neurons are "wired" to the adders in FIG. 1) is determined during training for use during real time pattern recognition. The test vector X is associated with class ĉ according to the following rule:

$$ĉ=\arg \max_\alpha z_\alpha. \quad (15)$$

The above classification rule assumes that the ratio of the number of training patterns for class $\alpha$ to the a priori probability of occurrence of class $\alpha$ is constant for all classes $\alpha=1,2,\ldots,C$.

As shown in FIG. 1, the outputs of the neurons are fed to a set of adders that produce the values $z_1, z_2, \ldots, z_C$ in accordance with equations (13) and (14) above. The processing block labeled "arg $\max_\alpha$" then determines the class ĉ of the vector X originally fed into the PNN.

Handoff Method Based on Recognition of Patterns in Signal Power

A handoff technique according to the present invention uses the following performance criterion: a handoff is executed to ensure that the probability of link failure, $P_F$, is less than or equal to a specified value $P_{F,max}$. The value for $P_{F,max}$ is preferably 0.02 or less, since higher failure rates result in degradation of the signal beyond the subjective tolerance of listeners. For this analysis, failure occurs if the received signal $s_k$ falls below the receiver threshold $S_T$, which is an intrinsic parameter of the receiver sensitivity. The design requirement is then:

$$P_F \equiv Pr\{s_k < S_T\} \leq P_{F,max}. \quad (16)$$

From equations (1) and (8), we have:

$$P_F = Pr\{r_k < 10^{S_T/20}\} = 1 - \exp\left\{-\frac{10^{S_T/10}}{2p_k}\right\}. \quad (17)$$

An inequality for $\bar{s}_k$ can be derived using equations (9) and (16), with the result $$\bar{s}_k \geq S_T - 10\log_{10}\left[\ln\left(\frac{1}{1-P_{F,max}}\right)\right] - \frac{10\gamma}{\ln 10}. \quad (18)$$

Figure 2:
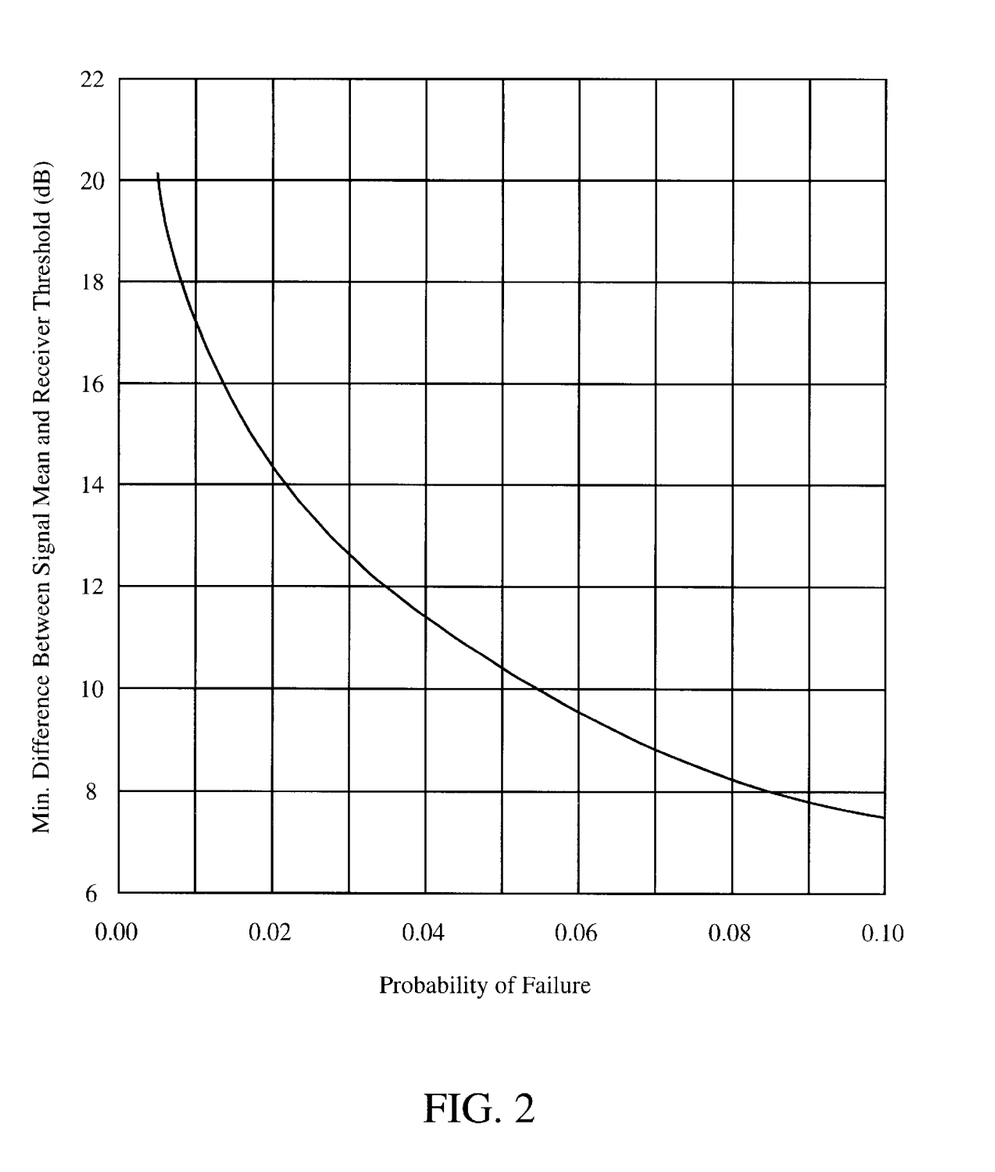
FIG. 2 is a graph of the minimum value of the difference between the signal mean $\bar{s}_k$ and the receiver threshold $S_T$ as a function of the probability of failure $P_{F,max}$.

FIG. 2 plots the minimum value of $\bar{s}_k - S_T$ as a function of $P_{F,max}$. For $P_{F,max} \ll 1$, the following approximation to equation (18) can be used:

$$\bar{s}_k \geq S_T - 10\log_{10}(P_{F,max}) + \frac{5P_{F,max} - 10\gamma}{\ln 10}. \quad (19)$$

In practice, $\bar{s}_k$ is not easily measurable. An estimate $\xi_k$ of $\bar{s}_k$ is obtained by averaging the past M samples of $s_k$:

$$\xi_k = \frac{1}{M}\sum_{m=0}^{M-1} s_{k-m}. \quad (20)$$

The value of M is preferably 10 to 100. The specific value used is a design parameter that depends on the sampling rate and the correlation length of the log-normal shadowing. The samples $s_k$ are measured at the mobile and preferably transmitted to the base station on the control channel for averaging at the base station. Alternatively, the mobile performs the averaging and transmits the estimates $\xi_k$ to the base station. It is noted that conventional handset hardware contains received signal strength indicator (RSSI) circuitry that can be used to determine the value of the samples. In the preferred embodiment, the $s_k$ values are obtained by sampling at equal spatial intervals. This assumption is equivalent to constant velocity of the mobile device and temporal sampling at regular intervals, or variable velocity and temporal sampling at correspondingly irregular intervals. Various known velocity estimation techniques can be used to estimate the mobile device velocity. Once the velocity is known, the sampling rate can be adjusted to ensure that the sampling corresponds to regular spatial intervals. Furthermore, the distance spanned by the samples $s_{k-(M-1)}, \ldots, s_k$ is preferably less than ⅓ the correlation length $d_0$ of the shadow fading process, and more preferably less than ⅒ the correlation length. Moreover, the distance between adjacent samples is preferably at least $\lambda/2$, so that adjacent samples are approximately independent. Under these conditions, $\xi_k$ is the sum of independent, identically distributed random variables. For sufficiently large M, the Central Limit Theorem states that $\xi_k$ approaches a Gaussian distributed random variable with mean $\bar{\xi}_k = \bar{s}_k$ and variance $\rho_{\xi_k}^2 = \sigma_{s_k}^2/M$. For $\bar{s}_k$ to satisfy equation (18) with 99% confidence, we require $$\xi_k \geq S_T - 10\log_{10}\left[\ln\left(\frac{1}{1-P_{F,\max}}\right)\right] - \frac{10\gamma}{\ln 10} + 3\sigma_{\xi_k} + \xi_{margin}, \quad (21)$$

where $\xi_{margin}$ is a margin of safety. This margin of safety is preferably in the range $\sigma_{\xi_k}$ to $3\sigma_{\xi_k}$.

Figure 6:
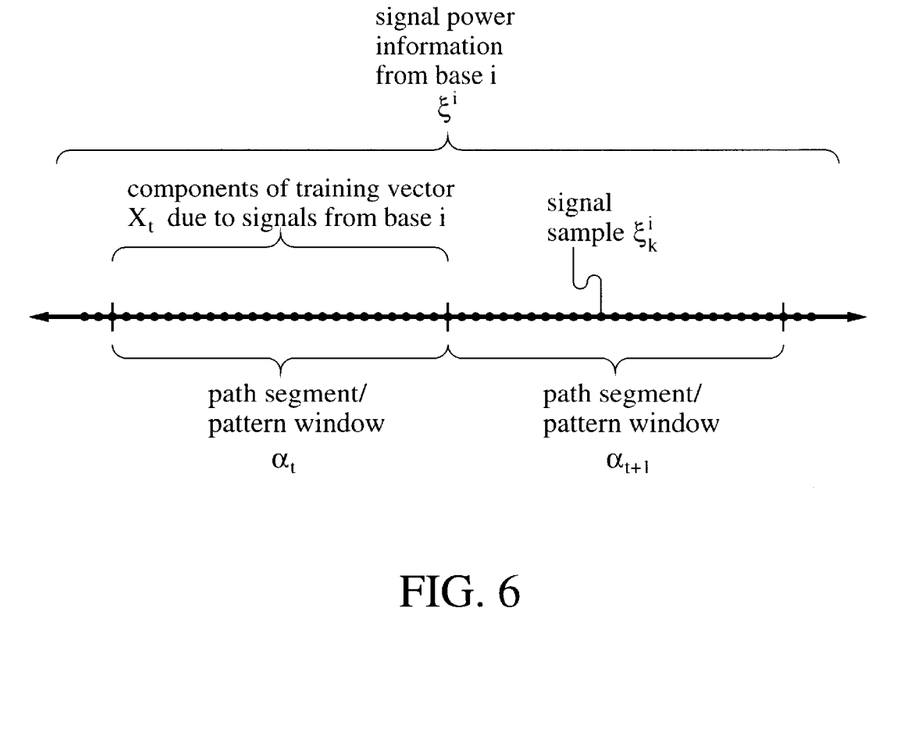
FIG. 6 is a diagram illustrating a few segments of a path followed by a mobile device, together with corresponding signal samples and their groupings into pattern windows.

Using relation (21) on the averaged signal, a handoff technique based on pattern recognition is now described. A test vector is derived from a set of averaged signal samples from a few (2 to 4) of the nearby base stations $B_i$ ($i=1, \ldots, i_{max}$) having the strongest signals. Samples from each of these base stations are collected within a spatial window corresponding to a segment of the mobile device path, as shown in FIG. 6. Let $N_w$ denote the number of averaged samples collected for each base station along a segment, i.e., $N_w$ is the sample length of the spatial window. The total number of samples in a pattern vector will thus be a multiple of $N_w$. A training run is made along each path to initialize the PNN for pattern recognition. The averaged signal samples from the nearby base stations are recorded for each path. Let $\xi^i = [\xi^i_0, \xi^i_1, \ldots, \xi^i_{N_{max}-1}]^T$ and $\xi^j = [\xi^j_0, \xi^j_1, \ldots, \xi^j_{N_{max}-1}]^T$ denote the averaged samples from base $B_i$ and base $B_j$, respectively, where the total number of samples recorded from each base station along a given path is $N_{max}$. The number of classes of patterns in the path is therefore $$C = N_{max}/N_w. \quad (22)$$

For each distinct training class $\alpha_t$, $t=0,1,\ldots,C-1$, a training vector $X_t^{FWD}$ is formed from all the samples within the corresponding spatial window, including samples from multiple nearby base stations. The class label $\alpha_t$ represents the segment index, or also can represent the midpoint of the spatial window. The ordering of the samples in the training vector is arbitrary, provided it is a consistent ordering. Preferably, the ordering is sequential and corresponds to travel of the device in the same direction as the training run. A second training vector $X_t^{REV}$ for the same class $\alpha_t$ is formed by reversing the order of the samples of $X_t^{FWD}$ to account for travel in the opposite direction of the training run. Thus, each class has two vectors that are dependent on each other, which is equivalent to one independent vector. Indeed, rather than storing both these vectors, the sample order can be reversed in real time during pattern matching, trading off memory for computation. Most pattern recognition applications require more than one training vector per class. However, in this handoff technique, one independent training vector per class has good results since the use of averaged signals together with class sequencing contributes to fewer miscalculations by the PNN.

Once the training vectors from the training run are stored, the patterns which correspond to handoff locations are determined as follows. The minimum sample, $\xi^i_{t,min}$, corresponding to base $B_i$ is determined for each class $\alpha_t$ (i.e., for each segment of the path):

$$\xi^i_{t,min} = \min(\xi^i_{tN_w}, \xi^i_{tN_w+1}, \ldots, \xi^i_{(t+1)N_w-1}), \; i=1,2,\ldots,i_{max}. \quad (23)$$

Base $B_i$ is an acceptable serving base station for class $\alpha_t$ if $\xi^i_{t,min}$ satisfies relation (21).

The method of determining handoff for a mobile device is described now. As a mobile device travels along the path, a vector of the averaged received signal samples from various base stations is fed as input to the PNN, with the vectors corresponding to segments of the path. The direction of travel by the mobile device can be deduced by observing the order of the outputs of the PNN, and a future need for handoff can be anticipated. To account for misclassifications (due to lack of pattern window synchronization, for example), a tolerance $T_M$ can be set for the difference between PNN outputs corresponding to the adjacent pattern windows. The value for $T_M$ is preferably in the range from 1 to 10, but is more preferably in the range from 2 to 4. Let $\hat{c}_k$ denote the class output for the k-th pattern window, $\beta_k$ denote the corresponding set of allowable serving base stations (determined during training), and $B_k \in \beta_k$ denote the serving base station. Also let $\Delta\alpha$ be the distance between adjacent training class labels. This distance $\Delta\alpha$ is typically 1 when $\alpha$ represents a class pattern index, and is typically some physical distance when $\alpha$ represents a location of a segment along a path. Conditions (24)–(27) are computed for the determination of handoff:

$$\|\hat{c}_k - \hat{c}_{k-1}\| \leq (\Delta\alpha)T_M, \quad (24)$$

$$\{B_k\} \cap \beta_{k+j} = \emptyset, \text{ for some } j \in \{1,2,\ldots,T_M\}, \quad (25)$$

$$\bigcap_{i=1}^{l+1} \beta_{k+i} = \emptyset, \text{ for } l > 0, \quad (26)$$

$$\bigcap_{i=1}^{l} \beta_{k+i} \neq \emptyset, \quad (27)$$

Condition (24) is satisfied when the recognized classes for adjacent windows are "close" within a tolerance $T_M$. If this condition is not satisfied, a window synchronization procedure shifts the alignment of the window frame with respect to the received samples to scan for proper synchronization. Condition (25) is satisfied when the current base station is not an allowable base station at some point within the tolerance $T_M$, indicating that a handoff is needed in the near future. Conditions (26) and (27) are used to determine a base station to which handoff is to be performed. These conditions are satisfied when some base station is allowable for a number of windows into the future, but is no longer allowable past this critical number of windows. If conditions (24)–(27) are satisfied, a handoff is made to an element of $$\bigcap_{i=1}^{l} \beta_{k+i}.$$

Simulations of the technique described above in the case of typical implementations illustrate the performance advantages of the present invention over conventional techniques that use the hysteresis rule. The simulations were performed for the cases of four and five nearby base stations. For simplicity, a mobile device is assumed in the simulation to move in a straight line at constant velocity. In this case, sampling at equal time intervals corresponds to sampling at equal spatial intervals.

Figure 3:
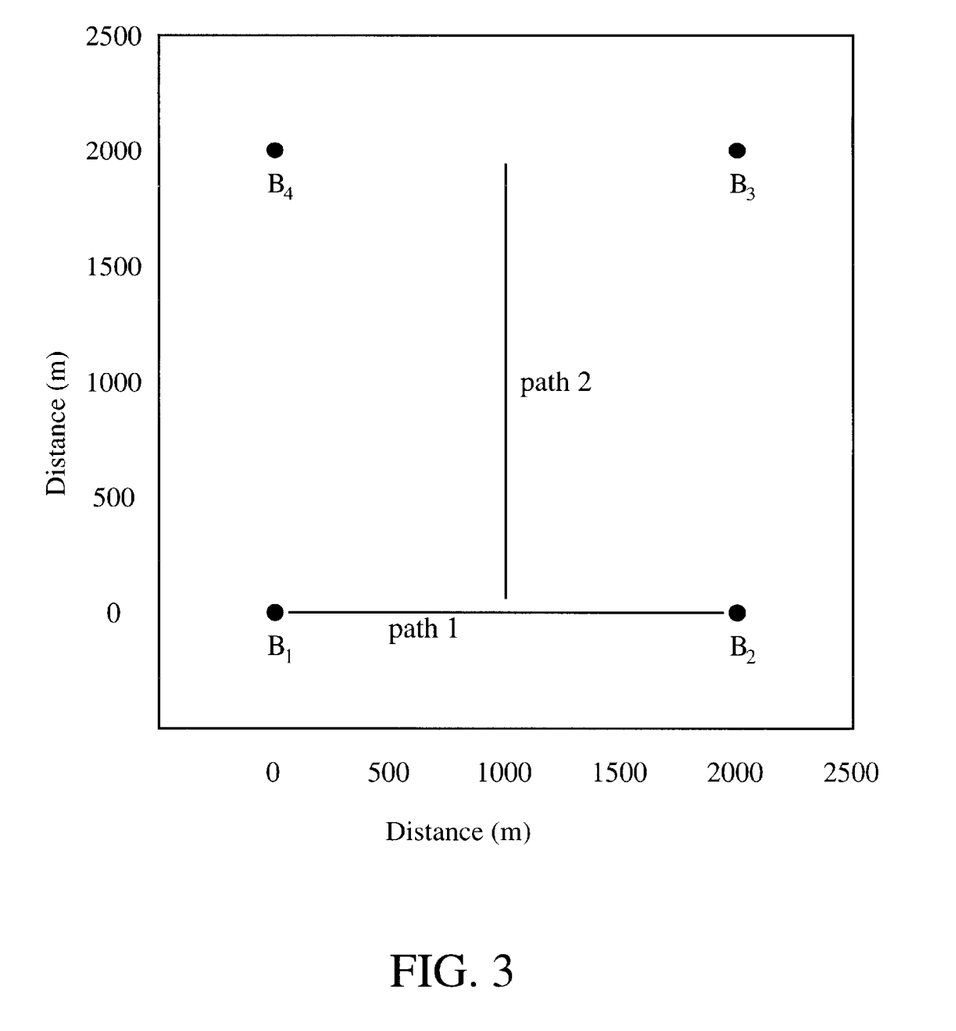
FIG. 3 illustrates a possible geometry of base stations and two possible paths of a mobile device for the case of four nearby base stations.

Let $s^i_k$ and $s^j_k$ denote the signals received at the mobile from bases $B_i$ and $B_j$, respectively. Assuming the mobile device is initially communicating with base $B_i$, the hysteresis rule is as follows: a handoff from base $B_i$ to base $B_j$ is performed if $\max\{s^t_k : t=1,\ldots,i_{max}\} = s^j_k$ and $s^j_k - s^i_k > H$. The hysteresis level H is specified in dB. Simulations are performed for several environments. FIG. 3 illustrates the geometry of the base stations and two paths of the mobile device for the case of four nearby base stations. The propagation model discussed earlier is used with independent log-normal shadow fading for a given environment, path, and base station. Table 1 below indicates the parameters used in the simulations, which also represent preferred values for use in a preferred embodiment corresponding to the simulation environment.

TABLE 1

| PARAMETER | VALUE |
| --- | --- |
| Carrier Wavelength ($\lambda$) | ⅓ m |
| Minimum Base Station Separation | 2000 m |
| Length of Pattern Window | 100 m |
| Exponent of Distance Dependence (n) | 4 |
| Standard Deviation of Shadow Fading ($\sigma_L$) | 8 dB |
| Correlation Length of Shadow Fading ($d_0$) | 20 m |
| Number of terms in (4) for Shadow Fading | 401 |
| Sampling Distance | $\lambda$ |
| Target Probability of Failure ($P_{F,max}$) | 0.02 |
| Number of Samples (M) to Estimate $\overline{S}_k$ | 10 |
| Smoothing Parameter for PNN ($\sigma_L^2$) | 1000 |
| Margin of Safety ($\xi_{margin}$) | $3\sigma_{\Xi k}$ |
| Misclassification Tolerance ($T_M$) | 2 |

Simulations were performed for 50 different environments for four paths of the mobile device for each base station geometry. Only one training run was used for each environment and path. In reality, the test runs might start and end at different locations with respect to the training runs. This aspect is accounted for by aligning the test patterns with the training patterns to minimize misclassifications. For each environment, four paths of the mobile device and five test runs per path were considered. Thus, the total number of test runs is 1000 for each case of four and five base stations.

Figure 4:
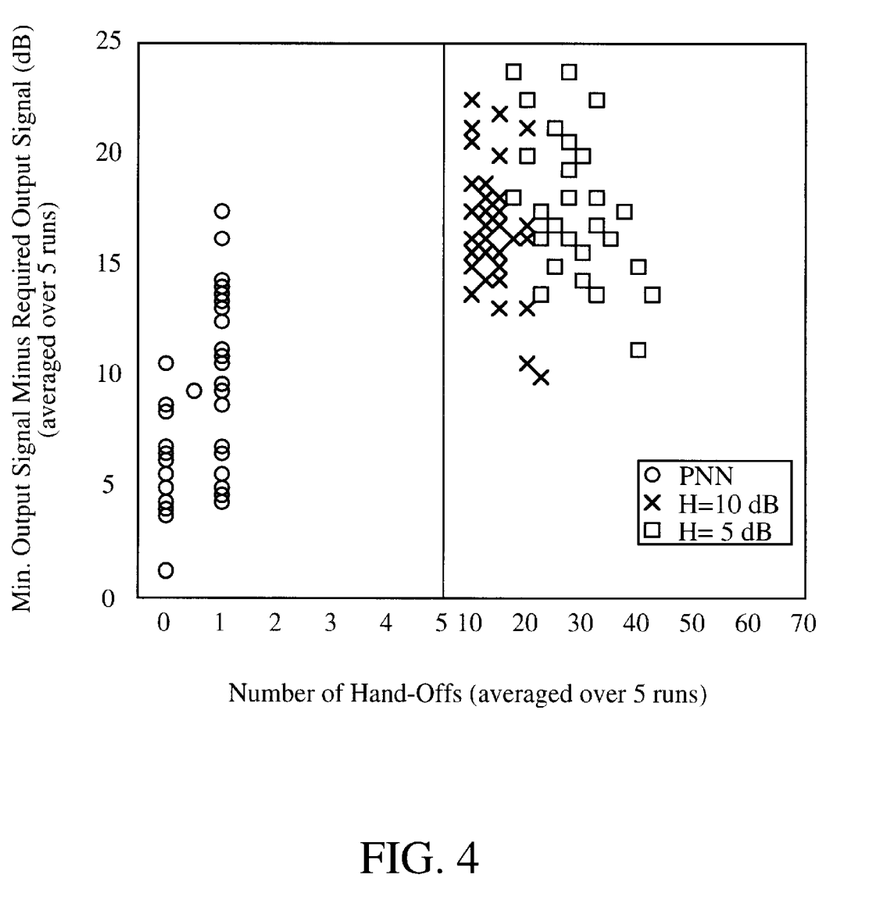
FIGS. 4 and 5 are graphs of the difference between the minimum output signal and the required signal level versus the number of handoffs for paths 1 and 2, respectively.
Figure 5:
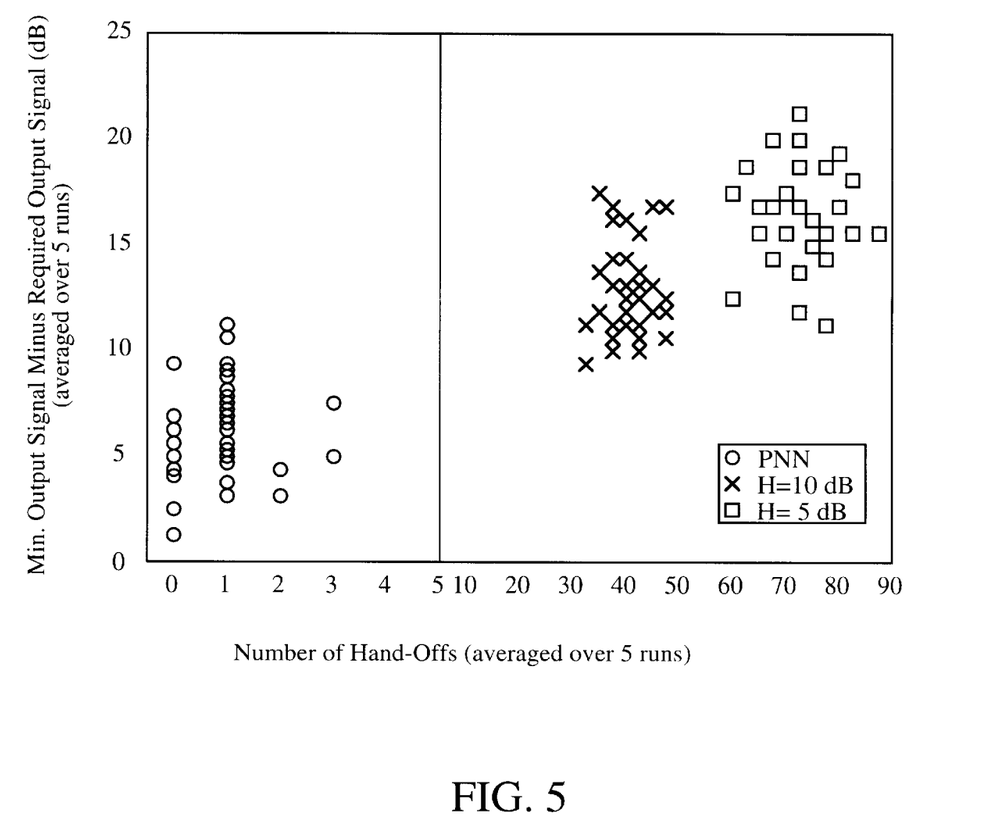

FIGS. 4 and 5 are plots of the difference between the minimum output signal for the test runs and the required signal level (obtained from relation (21)) versus the number of handoffs for paths 1 and 2. Each figure corresponds to a particular path for the case of four base stations. Performance results for various other paths of the mobile device and for the case of five nearby base stations are qualitatively similar to the results presented here. Each data point represents an average over five runs for a given environment. For clarity, the region from 0 to 5 handoffs has been magnified. The plots compare the handoff technique using a probabilistic neural network (PNN) with the conventional hysteresis rule using hysteresis levels of H=5 dB and H=10 dB. The hysteresis level H cannot be increased indefinitely to yield lower handoffs without resulting in an increased failure rate and possible handoffs to incorrect base stations. Out of a total of 2000 test runs, use of the PNN resulted in 99% of the runs having minimum signal levels above the required signal level for 2% probability of failure. Furthermore, around 97% of the runs resulted in accurate classification by the PNN. It is important to note that only one training run was used for each environment and path. The misclassification rate can be reduced if more training runs are used, e.g., adding more training vectors for each pattern class (i.e., segment of the path). In an alternate embodiment, additional training vectors can be added to account for seasonal changes in the propagation environment. For a given probability of failure, the pattern recognition based handoff technique performs fewer handoffs while the hysteresis rule executes several unnecessary handoffs. In some instances, the pattern recognition based handoff technique executes no handoffs because the signal is sufficiently strong to satisfy relation (21). In reality, one would expect a handoff as the mobile approaches another base station with a stronger signal. This performance can be achieved by using a large overlay hysteresis. Thus, in a preferred embodiment, the pattern recognition technique described above is supplemented by an overlay hysteresis, as follows. If the pattern recognition technique does not result in a handoff at a given point in time, then the power level of the minimum signal in the current window from the various base stations are compared. If the signal from another allowable base station has a power level at least 20 dB larger than that from the current base station, then handoff to the other base station is executed.

The handoff technique based on pattern recognition can be extended to other possible performance criteria. For example, the acceptable base stations can be ranked and this information can be used to improve handoff to the best base station. The method can be extended to consider mobile devices changing paths at intersections with variable speeds. For example, a velocity estimator can be used in a preprocessing stage, and velocity information can then be used to appropriately adjust the sampling rate. In addition, unsupervised learning methods can be applied to eliminate the necessity of training runs. For example, real time data can be used for training by correlating handoff information using conventional hysteresis methods with measured signal samples to identify new paths. Once the paths are identified, the pattern recognition technique can be used to anticipate and initiate handoff. It will be appreciated by those skilled in the art that the concepts and techniques of the present invention do not need to be implemented using probabilistic neural networks. Other implementations that are well known in the art can also be used to achieve the same effect. For example, various feature extractors, pattern classifiers, learning machines, and neural network architectures can be used. Thus, the spirit and scope of the present invention should not be limited to the specific details of the embodiments described above.

What is claimed is:

1. A method for determining handoff in a wireless communication system comprising a plurality of base stations and a mobile device, the method comprising:

a) collecting at nearby base stations signal power level information representative of signal strength between the mobile device and the nearby base stations;

b) associating the power level information with predetermined power level patterns to produce an output representing measures of similarity between the power level information and the predetermined power level patterns;

c) selecting a sequence of matching patterns from the set of predetermined power level patterns, wherein each of the matching patterns has a maximal degree of similarity with a portion of the power level information; and d) analyzing a sequence of sets of allowable base stations to determine an appropriate base station for handoff, wherein the sequence of sets of allowable base stations correspond to the sequence of matching patterns.

2. The method of claim 1 wherein the predetermined power level patterns are correlated with shadow fading in a propagation environment of the mobile device.

3. The method of claim 1 wherein the signal power level information comprises a sequence of average signal power level estimates corresponding to mobile device positions separated by less than a correlation length of a log-normal shadow fading in a propagation environment of the mobile device.

4. The method of claim 3 wherein each of the average signal power level estimates is an average of signal power level samples corresponding to mobile device positions separated by less than a wavelength of a carrier signal of the communication system.

5. The method of claim 4 wherein the signal power level samples are measured at times selected such that the samples correspond to mobile device positions separated by approximately equal spatial intervals.

6. The method of claim 1 wherein associating the power level information with the predetermined power level patterns comprises applying the power level information to a probabilistic neural network whose weights are equal to training vectors derived from training power level information.

7. The method of claim 1 wherein the predetermined power level patterns have a predetermined sequence corresponding to a sequence of patterns observed in a training session.

8. The method of claim 1 further comprising determining a degree to which adjacent patterns in the sequence of matching patterns meet an adjacent pattern matching tolerance value.

9. The method of claim 1 wherein analyzing the sequence of sets of allowable base stations to determine the appropriate base station for handoff comprises selecting a base station that is an allowable base station for a subsequent pattern in a predetermined sequence of power level patterns.

* * * * *

UNITED STATES PATENT AND TRADEMARK OFFICE
CERTIFICATE OF CORRECTION

PATENT NO. : 6,240,291 B1
DATED : May 29, 2001
INVENTOR(S) : Narasimhan et al.

It is certified that error appears in the above-identified patent and that said Letters Patent is hereby corrected as shown below:

Title page,
Item [73], Assignee, the name of the assignee should be -- The Board of Trustees of the Leland Stanford Junior University -- not "The Board of Trustees of the Leland Stamford Junior University".

Item [73], Assignee, the address of the assignee should be -- Palo Alto, CA -- not "Stamford, CA."

Signed and Sealed this

Nineteenth Day of February, 2002

Attest:

JAMES E. ROGAN
Attesting Officer    Director of the United States Patent and Trademark Office